Sept. 13, 1927.
G. B. ARDUSER
1,642,289
MOLD CLEANING AND POLISHING APPARATUS
Filed Nov. 16, 1925 2 Sheets-Sheet 1
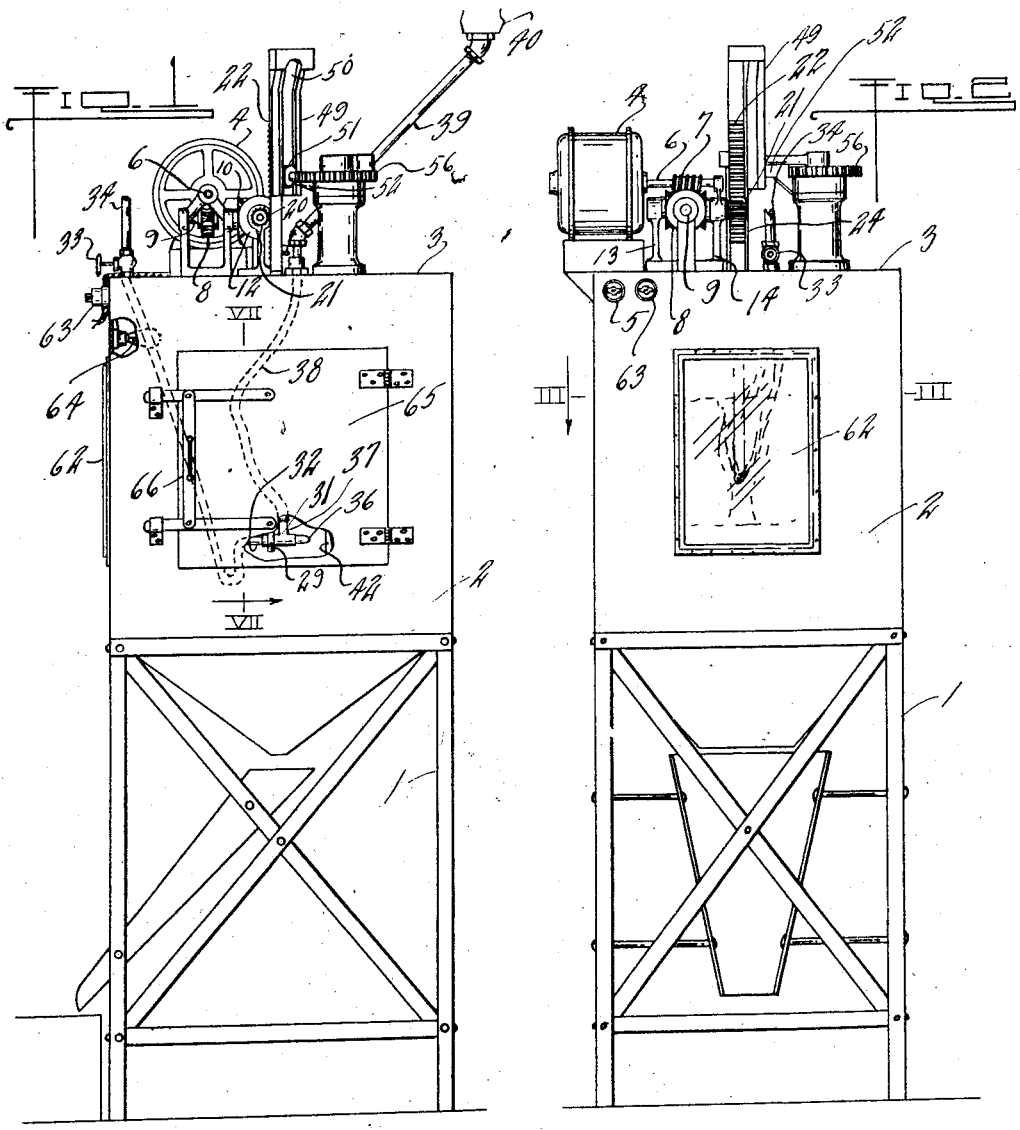
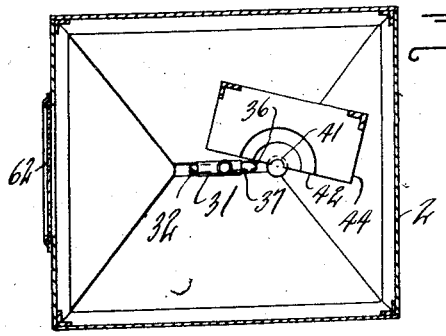
George B. Arduser
INVENTOR
BY
Geo Kirk
ATTORNEY

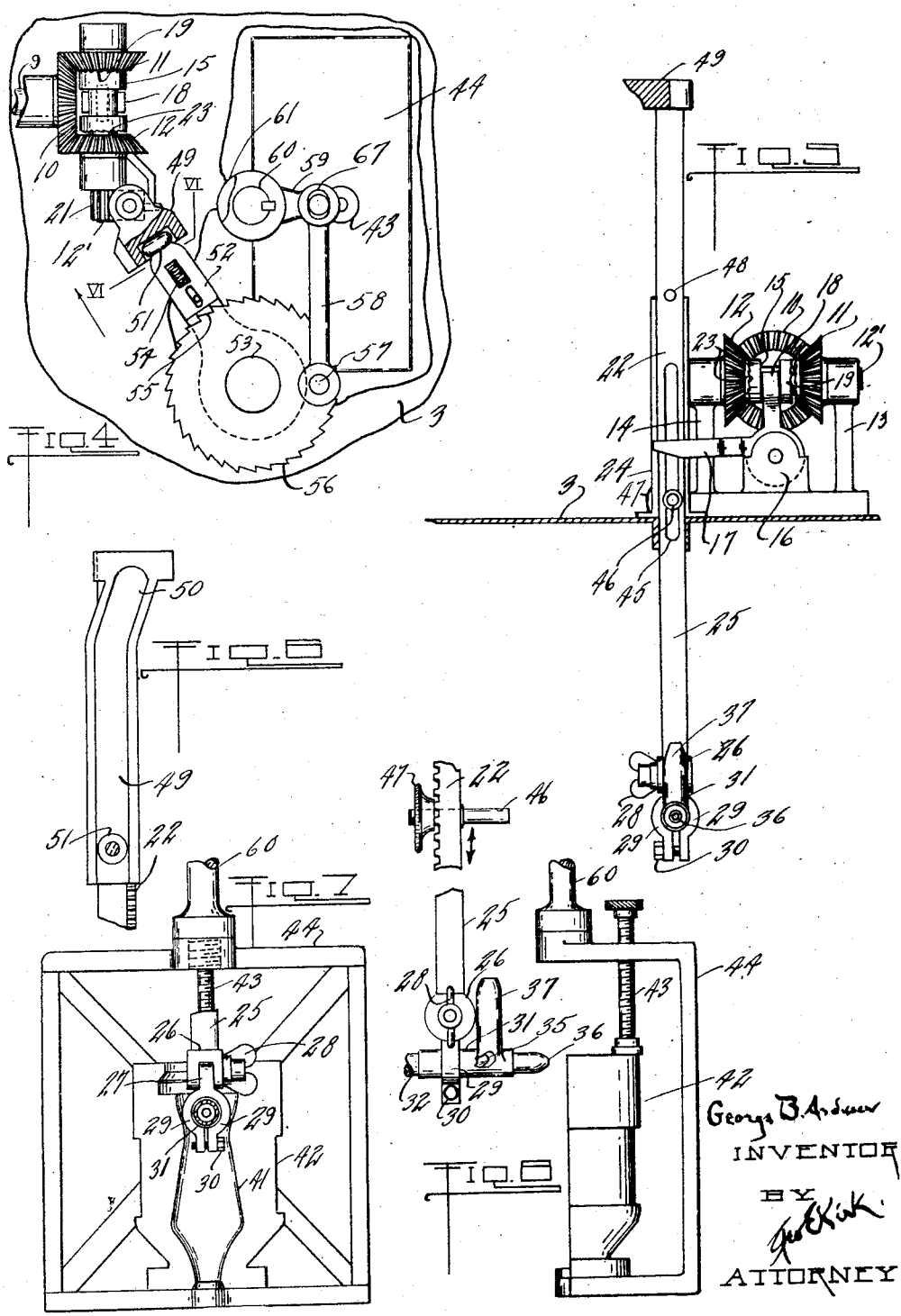

Patented Sept. 13, 1927.

1,642,289

UNITED STATES PATENT OFFICE.

GEORGE B. ARDUSER, OF TOLEDO, OHIO.

MOLD CLEANING AND POLISHING APPARATUS.

Application filed November 16, 1925. Serial No. 69,355.

This invention relates to mold surface forming and maintenance.

This invention has utility when incorporated in sand blast apparatus for sectional molds for forming articles of glassware, as for dressing the mold lining of two-part finishing molds.

Referring to the drawings:

Fig. 1 is a side elevation, with parts broken away, of an embodiment of the invention;

Fig. 2 is a view of the apparatus of Fig. 1 from the left, parts being broken away;

Fig. 3 is a section on the line III—III, Fig. 2 looking in the direction of the arrow;

Fig. 4 is a plan view, with parts broken away, of features of the drive;

Fig. 5 is a view of features of the drive of Fig. 4 from the right;

Fig. 6 is a detail view of the camway for effecting the ratchet drive operation for the mold rocking, on the line VI—VI, Fig. 4;

Fig. 7 is a partial view on the line VII—VII, Fig. 1, looking in the direction of the arrow; and Fig. 8 is a side elevation of the nozzle for the abrasive blast into the mold, as shown in Fig. 7.

Standard 1 is herein shown as mounting housing 2 having roof or top 3 on which is mounted motor 4 to be started in operation by turning on switch 5. This motor 4 has shaft 6 carrying worm 7 in mesh with worm wheel 8 as a speed reduction drive for shaft 9. This shaft 9 has fixed thereon bevel gear 10 in mesh with bevel gears 11, 12, loosely on shaft 12'. This shaft 12' is mounted in bearings 13, 14, and between the bevel gears 11, 12, carries splined collar 15.

Bracket 16 below the shaft 12' provides a fulcrum for angle lever having control arm 17 and fork 18. This fork 18 coacts with the collar 15 and as this lever is rocked in the bearing or bracket 16, serves to shift the collar 15 as a clutch member longitudinally of the shaft 12' in up-direction of movement of the arm 17 for throwing the collar 15 to have one way jaw clutch 19 connect the shaft 12' to be driven from the gear 11 to rotate the shaft 12' carrying pinion 21 coacting with rack 22. In the reverse or downward rocking of the lever 17, 18, the collar 15 is rocked to have the clutch 19 clear or disconnect the bevel gear 11 and be thrown to have clutch 23 connect with bevel gear 12 as driven from the shaft 9 to actuate the shaft 12'.

It follows, that with the continuous direction of rotation for the shaft 9, the one-way clutch 19 is effective for one direction of rotation of the pinion 21, while the one-way clutch 23 is effective for reverse direction of rotation of the pinion 21.

The rack 22 is vertically reciprocable in guide means 24 and has extension 25 therefrom below the roof or top 3 of the housing 2 into the housing and there carries forked terminal 26, as a pair of eyes, between which is engaged eye 27 clamped in adjusted angular position by wing bolt 28. This eye 27 has a pair of clamping wings 29 to be set up into clamping position by bolt 30 in mounting nozzle manifold or T 31. Accordingly, the clamp 29 may determine the position along the manifold or nozzle where the clamping is to occur, while the adjustment of the bolt 28 may determine the direction of this nozzle, as to whether horizontal, or inclined to the horizontal. The tubular portion 31 of this nozzle structure, has anchored therein flexible duct 32 as a compressed air supply line, the flow of air in which is determined by valve 33 from compressed air line 34.

In this fitting 31, the compressed air line 34 has air discharge tip 35 directed toward the blast tip or nozzle 36 and disposed just below branch 37 to which is connected flexible duct 38 from pipe 39 extending to hopper 40, as an abrasive container, herein shown as a pan for sand when the operation is for removing corrosion or adherent particles from the interior of blow molds or press molds for glassware. The control of the air blast determines the flow or drawing in of the abrasive from the sand duct 38 to be ejected from the tip or nozzle 36 for impinging upon the surface to be cleaned, as lining 41, of molds 42.

The operation of the drive from the motor 4 is effective through the rack 22 for elevating and lowering the nozzle 36 so that in a vertical line, there is directed against the mold lining 41, a cleaning effecting blast of the abrasive.

The mold section 42 is anchored by clamping screw 43 in frame 44. The rack 22 in its ascent carries the extension or bar 25 therewith. This bar 25 has slot 45 in which is mounted pin 46 adjustable by knurled nut 47 so that the position of this nut in the slot 45 may be varied. Accordingly, the extent of ascent of the nozzle 36 may be adjusted proportional to the height of the mold section 42 which is undergoing treatment, for as the pin 46 moves upward it strikes the arm 17 and thus effects a reversal of the drive for causing the pinion 21 to drive this bar 25 for descent. The bottom limit of travel for the nozzle 36 is constant. As this point is reached, pin 48 strikes the upper side of the arm 17 and effects the reversal of the drive for causing the rack 22 to move upward. There is, accordingly, in this mode of operation a vertical reciprocation of the nozzle 36 as directed toward the inside of the mold section 42. This is only a straight line travel.

For cleaning or redressing the entire interior of the mold supplemental drive is provided. To this end, there is fixed with the bar 25, camway 49 having near its upper portion, offset 50. Coacting with this camway 49, 50, is roller 51 on arm 52 rockable on shaft 53. This arm 52 has spring 54 normally urging pawl 55 into engagement with ratchet wheel 56 loosely mounted on the shaft 53. The offset 50 in the cam 49 is such that in the descent of the bar 25, the arm 52 may be rocked a full distance of a tooth on the ratchet 56, then in ascent the swinging or advance of the roll in coacting through the offset 50 to the straight portion 49, effects a one-tooth advance of the ratchet wheel 56 and there is thus a speed reduction intermittent drive of this ratchet 56. This ratchet 56 carries wrist pin 57 from which extends link 58 to crank 59 fixed with stem 60 mounted by bearing 61 with the housing roof 3 so that in the continued slow speed rotation of the ratchet 56, there is rocking of this shaft 60 through a range of approximately 180°. This shaft 60 at its lower portion carries the yoke or frame 44 in which the mold section 42 is mounted to have the axis for the lining 41 approximate the axis of the shaft 60. Accordingly, the drive which effects the reciprocation vertically of the nozzle 36, at a slower speed rate effects the oscillation of the mold section 42 so that the up and down travel of the nozzle 36 is directed from one side clear across to the other side of the lining 41 in the cycle of operations which occurs through the complete rotation of the ratchet wheel 56. A complete rotation of the ratchet wheel 56 means the abrasive action has taken place over and back or across the lining 41 two times.

The housing 2 is provided with window 62 through which observation of the condition of the lining may be had by turning on switch 63 to illuminate bulb 64 so that the condition of the lining 41 may be observed without opening door 65. When the condition of the work is such that the operation is completed, latch 66 may be released, the door 65 opened, and the mold section 42 replaced with another mold section whether such be a new mold section to be initially dressed or whether it be an old mold section which has become pitted, corroded or otherwise loaded with material which is detrimental to the production of the desired character of output.

Slot connection 67 between the link 58 and the crank 59 precludes dead center trouble.

What is claimed and it is desired to secure by United States Letters Patent is:

1. A mold lining cleaner comprising a mold section mounting, an abrasive blast, means for directing the blast into the lining of the mold on the mold mounting, and means for reciprocating the blast directing means lengthwise of the mold including a guide, a plunger directed by said guide, a crank from the plunger for rocking the mold mounting, and a pawl and ratchet mechanism for actuating the crank.

2. A mold lining cleaner comprising a mold section mounting, an abrasive blast, means for directing the blast into the lining of the mold on the mold mounting, a crank and link device for rocking the mold mounting, a rack and pinion device for reciprocating the blast directing means, a drive for the latter device, and an intermittent grip connection between one of said devices and the drive for thereby directly actuating said one device and through said one device effective for operating the other device.

3. A mold lining cleaner comprising a mold section mounting having an axis, an abrasive blast, means for directing the blast transversely through said axis into the lining of the mold on the mold mounting, a crank and link device for rocking the mold mounting on said axis, and an actuating device for reciprocating the blast directing means as controlled by said guide.

4. A sand blast apparatus comprising a housing, a motor thereon, a pivotal mounting for an article in the housing, an abrasive blast having a delivery nozzle directed transversely of said article mounting pivot, a reciprocable mounting for the nozzle, and transmission means from the motor for effecting rocking of the article mounting and reciprocation of the nozzle mounting as to the housing.

5. A sand blast apparatus comprising a housing, a motor mounted therewith, a mounting for a mold in the housing having a bearing, an abrasive blast having a delivery nozzle directed transversely of said mold mounting, housing reciprocable axially of a mounting for the nozzle in the housing reciprocable axially of the mold mounting, and transmission means from the motor for shifting the mountings as to the housing.

6. A mold lining cleaner comprising a housing, a mold section seat for the mold having a face to be cleaned, a mounting for the seat providing an axis within the housing toward which the mold face to be cleaned may be exposed, an abrasive blast nozzle, and mounting means for directing the blast nozzle to have a radial discharge path as to said axis at all times and against the mold on the mold mounting, and means for rocking the mold mounting on said axis.

7. A mold lining cleaner comprising a housing, a mold section seat for a mold having a face to be cleaned, a mounting for the seat providing an axis in the housing toward which the mold face to be cleaned may be exposed, an abrasive blast nozzle, mounting means for directing the blast nozzle into the lining of the mold on the mold mounting across said axis at all times, actuating means for reciprocating the blast directing mounting means lengthwise of the mold, and a control device for shifting the mold mouting on its axis during said nozzle reciprocation.

In witness whereof I affix my signature.

GEORGE B. ARDUSER.

Certificate of Correction.

Patent No. 1,642,289.                         Granted September 13, 1927, to

GEORGE B. ARDUSER.

It is hereby certified that error appears in the printed specification of the above-numbered patent requiring correction as follows: Page 2, line 129, claim 5, strike out the words " housing reciprocable axially of "; and that the said Letters Patent should be read with this correction therein that the same may conform to the record of the case in the Patent Office.

Signed and sealed this 18th day of October, A. D. 1927.

[SEAL.]                                                 M. J. MOORE,
*Acting Commissioner of Patents.*